H. J. WATTS.
FLOATING TOOL CHUCK.
APPLICATION FILED NOV. 22, 1916.

1,241,177.

Patented Sept. 25, 1917.

WITNESS
R. F. Dilworth
B. E. Jenkins

INVENTOR.
Harry J. Watts
By Max. H. Srolovig
his atty

UNITED STATES PATENT OFFICE.

HARRY J. WATTS, OF TURTLE CREEK, PENNSYLVANIA.

FLOATING TOOL-CHUCK.

1,241,177. Specification of Letters Patent. Patented Sept. 25, 1917.

Application filed November 22, 1916. Serial No. 132,775.

*To all whom it may concern:*

Be it known that I, HARRY J. WATTS, a subject of the King of England, residing at Turtle Creek, county of Allegheny, and State of Pennsylvania, have invented certain new and useful Improvements in Floating Tool-Chucks, of which the following is a specification.

This invention relates to floating tool chuck and has for its object to provide a chuck of such type, in a manner as hereinafter set forth, with a plurality of elements capable of being shifted to position a tool eccentric with respect to the axis of the chuck for enlarging the opening initially made by the tool.

A further object of the invention is to provide a floating tool chuck in a manner as hereinafter set forth, with a plurality of self-alining elements capable of being adjusted out of alinement to position a tool eccentric with respect to the axis of the chuck to enable the enlarging of an opening initially bored by the tool.

A further object of the invention is to provide a floating tool chuck with a plurality of spring controlled elements capable of self-alining and further capable of being adjusted out of alinement to position a tool eccentric with respect to the axis of the chuck and to further provide means for fixedly securing said elements in alining position and for further maintaining said elements in an adjusted position.

A further object of the invention is to provide a floating tool chuck, having means in a manner as hereinafter set forth, for positioning a tool eccentric with respect to the axis of a chuck for the purpose of enlarging an opening initially made by the tool.

A further object of the invention is to provide a tool chuck having a plurality of spring controlled adjustable elements for the purpose referred to and to further provide a chuck with means for increasing or decreasing the tension of the spring controlled elements.

Further objects of the invention are to provide a floating tool chuck for the purpose set forth which is simple in its construction and arrangement, strong, durable, efficient and convenient in its use, designed for any purpose wherein it is found applicable, readily assembled and disassembled, and comparatively inexpensive to manufacture.

With the foregoing and other objects in view the invention consists of the novel construction, combination and arrangement of parts as hereinafter more specifically described and illustrated in the accompanying drawing, wherein is found an embodiment of the invention, but it is to be understood that changes, variations and modifications can be resorted to which come within the scope of the claims hereunto appended.

In the drawings wherein like reference characters denote corresponding parts throughout the several views:—

Figure 1:
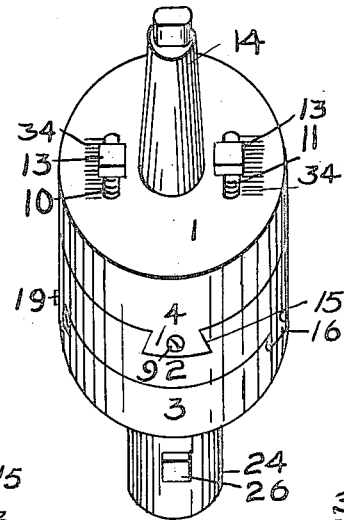
Figure 1 is a perspective view of the tool chuck in accordance with this invention with the spring controlled elements in alinement.
Figure 2:
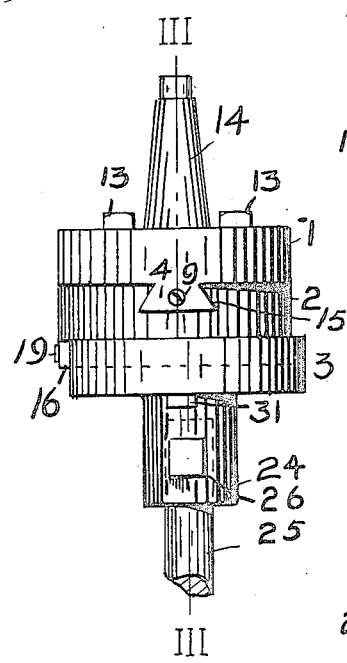
Fig. 2 is an elevation of the chuck with one of the spring controlled elements adjusted and further illustrating the axis of the tool being positioned eccentric with respect to the axis of the chuck.
Figure 3:
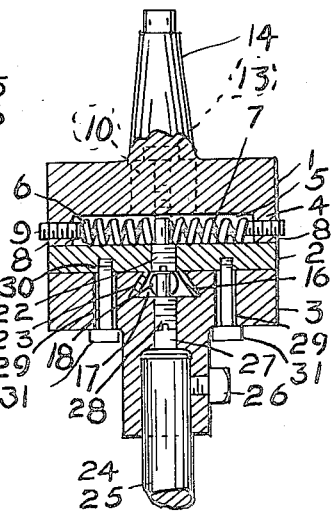
Fig. 3 is a section on line 111—111 Fig. 2.
Figure 4:
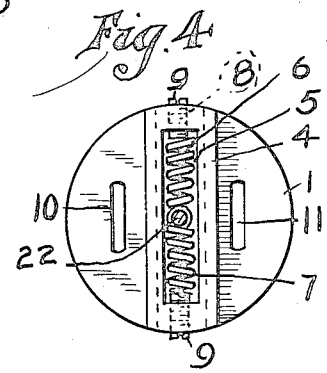
Fig. 4 is an inverted plan view of the stationary element.
Figures 5, 6:
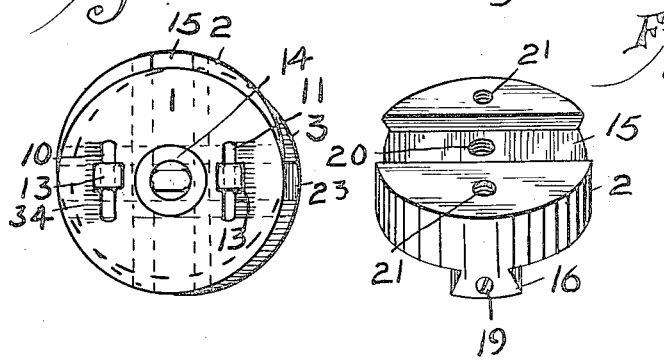
Fig. 5 is a perspective view of the inner spring controlled element.
Fig. 6 is a top plan view of Fig. 2.

Referring to the drawings in detail the body portion of the chuck comprises a stationary element 1, in the form of a circular disk, an intermediate spring controlled shiftable element 2, in the form of a circular disk, and an outer spring controlled element 3, in the form of a circular disk.

The element 1 has its forward face provided with a dove-tail tongue 4 of a length equal to the diameter of the element 1 and said tongue 4 is provided with a groove or pocket 5, in which is seated a pair of tensioning springs 6, 7. Each end of the tongue 4 has an opening 8, extending in the direction of the length of the tongue and the wall of each of said openings 8 is threaded. Extending through each of the openings 8 is a peripherally threaded adjusting member 9, the function of which is to increase or decrease the tension of the spring within the pocket 5. The adjusting members 9 abut against the outer ends of the springs 6, 7.

The element 1 is formed with a pair of opposed slots 10, 11, through which extend clamping screws 13 for a purpose to be presently referred to. Formed integral with the rear face of the element 1 is a tang 14 which is employed for connecting the chuck to any suitable operating means therefor.

The intermediate element 2 has its rear face formed with a dove-tail groove 15 of a length equal to that of the diameter of said element 2 and the groove 15 is adapted to receive the tongue 4 on the forward face of the element 1 and by such an arrangement the element 2 is slidably connected to the element 1. The forward face of the element 2 has a dove-tail tongue 16 of a length equal to the diameter of said element 2 and constructed in the same manner as the tongue 4 of the element 1, that is to say the tongue 16 has a pocket or recess in which is arranged a pair of tensioning springs and said tongue 16 also has adjusting members, similar to the members 9, for increasing or decreasing the tension of the springs mounted in the pocket 16. The pocket of the tongue 16 is indicated at 17, springs at 18 and the adjusting members at 19.

The element 2, in the bottom of the groove 15, centrally thereof, has a threaded opening 20 and said element 2, in the rear face thereof, at each side of the opening 20, has a threaded socket 21.

Secured in the threaded openings 20 of the element 2 and extending into the pocket 5 of the tongue 4 is an abutment 22 which is arranged between the opposed ends of the springs 6, 7, and the function of the abutment 22 is to compress either of the springs 6, 7, when the element 2 is shifted or adjusted on the tongue 4, so that when pressure is released the compressed spring will automatically shift the element 2 to alining position with respect to the element 1.

The threaded pockets 21 associate with the clamping screws 13 and these latter are adapted to engage in the pockets 21 to prevent the shifting of the element 2 relatively to the element 1 and further for the purpose of maintaining said element 2 in the adjusted position.

The element 3 has its rear face formed with a dove-tail groove 23 of a length equal to the diameter of the element 3 and the tongue 16 of the element 2 is mounted in said groove 23 whereby said elements 2, 3, are slidably connected together.

Formed integral with the forward face of the element 3 is a socket forming member 24 for the reception of a tool 25. A clamping screw 26 is employed for fixedly securing the tool in the member 24.

Centrally of the element 3 the latter is formed with an opening 27 which communicates at one end with the inner of the members 24 and at its other end opens into the groove 23. The wall of the opening 27 is threaded and engaging with said threaded wall, as well as extending into the groove 23 between the opposed ends of the spring 18, is an abutment 28 performing a function similar to that performed by the abutment 22.

The element 3, at each side of the member 24, is slotted as at 29, and said slots 29 are disposed at an angle with respect to the slots 10, 11. Extending through the slots 29 and having threaded engagement in the sockets 30, formed in the forward face of the section 2, are clamping screws 31 which perform a function similar to the function performed by the clamping screws 13.

The clamping screws 29, in connection with the sockets 30, will maintain the element 33 when adjusted relatively to the elements 1 or 2 and by such an arrangement the tool 25 can have its axis positioned eccentrically with respect to the axis of the chuck body. The screws 29 in connection with the sockets 30 also enable the maintaining of the element 3 when adjusted to aline with the element 2.

The rear face of the element 1 and the forward face of the element 3 is provided with a scale 34 as a guide for adjusting the said elements 3, 2.

When the elements 2, 3, are adjusted, the adjustment of the former is had against the action of the springs 6, 7, and the latter against the action of the springs 18 so that when these elements have been released from adjusted position they will be automatically shifted to normal position so as to aline with the element 1, although by way of example the chuck is illustrated as formed with three circular disks yet it is to be understood that this number can be increased or diminished if desired and also as shown by way of example the element 3 is provided with a socket forming member 34, but it is obvious that any suitable means can be provided on the disk for coupling a tool therewith.

The element 1 is termed a carrier and when referred to as stationary it is to be understood that such term is employed as to define it with respect to the sliding movement of the elements 2, 3. The elements 1, 2 and 3 bodily rotate together, but the elements 2, 3, are slidable relative to the element or carrier 1 and when the term stationary is employed it is merely applicable to the sliding movement of the elements 2, 3, with respect to the element 1, the latter being stationary in such particular.

What I claim is:—

1. A floating tool chuck comprising a carrier having means for connection with a prime mover, a plurality of inter engaging spring controlled elements normally alining with each other and with said carrier and slidably connected together and with the carrier, said elements capable of being shifted in parallel planes with respect to the carrier and with respect to each other, means for locking said elements when shifted from normal position, and one of said elements having means for attaching a tool therewith.

2. A floating tool chuck comprising a carrier having means for connection with a prime mover, a plurality of inter engaging elements normally alining with each other and with said carrier and slidably connected together and with the carrier, said elements capable of being shifted in parallel planes with respect to the carrier and with respect to each other, means for locking said elements when shifted from normal position, and one of said elements having means for attaching a tool therewith, and resilient members mounted in the carrier and in one of said elements for restoring said element to normal position when released.

3. A floating tool chuck comprising a carrier having means for connection with a prime mover, a plurality of inter engaging elements normally alining with each other and with said carrier and slidably connected together and with the carrier, said elements capable of being shifted in parallel planes with respect to the carrier and with respect to each other, means for locking said elements when shifted from normal position, and one of said elements having means for attaching a tool therewith, and resilient members mounted in the carrier and in one of said elements for restoring said element to normal position when released, and means supported by the carrier and one of said elements for regulating the tension of said members.

4. A floating tool chuck comprising a carrier having means for connection with a prime mover, a plurality of inter engaging elements normally alining with each other and with said carrier and slidably connected together and with the carrier, said elements capable of being shifted in parallel planes with respect to the carrier and with respect to each other, means for locking said elements when shifted from normal position, and one of said elements having means for attaching a tool therewith, and resilient members mounted in the carrier and in one of said elements for restoring said element to normal position when released, and abutments carried by said elements for compressing the resilient members when said elements are shifted in either direction whereby when the elements are released they will return to normal position.

5. A floating tool chuck comprising a carrier having means for connection with a prime mover, a plurality of inter engaging elements normally alining with each other and with said carrier and slidably connected together and with the carrier, said elements capable of being shifted in parallel planes with respect to the carrier and with respect to each other, means for locking said elements when shifted from normal position, and one of said elements having means for attaching a tool therewith, and resilient members mounted in the carrier and in one of said elements for restoring said element to normal position when released, and means supported by the carrier and one of said elements for regulating the tension of said members, and abutments carried by said elements for compressing the resilient members when said elements are shifted in either direction whereby when the elements are released they will return to normal position.

6. A floating tool chuck comprising a carrier provided with a dove-tail tongue having a pocket, a plurality of shiftable elements, one of said elements provided with a tongue having a pocket and further provided with a groove for the reception of the tongue of the carrier, the other of said elements provided with a groove for the reception of the tongue of the first mentioned element, and resilient members mounted in said pockets for restoring said elements to normal position after being shifted.

7. A floating tool chuck comprising a carrier provided with a dove-tail tongue having a pocket, a plurality of shiftable elements, one of said elements provided with a tongue having a pocket and further provided with a groove for the reception of the tongue of the carrier, the other of said elements provided with a groove for the reception of the tongue of the first mentioned element, and resilient members mounted in said pockets for restoring said elements to normal position after being shifted, and abutments carried by said elements and extending into said pockets for compressing the resilient members when the elements are shifted in either direction whereby when the elements are released they will be returned to normal position.

8. A floating tool chuck comprising a carrier provided with a dove-tail tongue having a pocket, a plurality of shiftable elements, one of said elements provided with a tongue having a pocket and further provided with a groove for the reception of the tongue of the carrier, the other of said elements provided with a groove for the reception of the tongue of the first mentioned element, and resilient members mounted in said pockets for restoring said elements to normal position after being shifted, and means carried by the tongues for regulating the tension of said members.

9. A floating tool chuck comprising a carrier provided with a dove-tail tongue having a pocket, a plurality of shiftable elements, one of said elements provided with a tongue having a pocket and further provided with a groove for the reception of the tongue of the carrier, the other of said elements provided with a groove for the reception of the tongue of the first mentioned elements, and resilient members mounted in said pockets for restoring said elements to normal position after being shifted, and abutments carried by said elements and extending into said pockets for compressing the resilient members when the elements are shifted in either direction whereby when the elements are released they will be returned to normal position, and means carried by the tongues for regulating the tension of said members.

10. A floating tool chuck comprising a carrier, and a plurality of normally alining inter engaging spring controlled elements slidably connected with and normally alining with said carrier, said elements capable of being shifted in parallel planes with respect to each other and with respect to the carrier, and means for locking said elements in shifted position.

11. A floating tool chuck comprising a carrier, and a plurality of normally alining inter engaging spring controlled elements slidably connected with and normally alining with said carrier, said elements capable of being shifted in parallel planes with respect to each other and with respect to the carrier, and means for locking said elements in shifted position, and means supported by the carrier and one of said elements for regulating the tension of the compressed springs for said elements.

12. A floating tool chuck comprising a carrier, and a plurality of normally alining inter engaging spring controlled elements slidably connected with and normally alining with said carrier, said elements capable of being shifted in parallel planes with respect to each other and with respect to the carrier, and means for regulating the tension of the compressed springs for said element.

In testimony whereof I affix my signature in the presence of two witnesses.

HARRY J. WATTS.

Witnesses:
MAX H. SROLOVITZ,
LUELLA H. SIMON.